UNITED STATES PATENT OFFICE.

HEINRICH REITZ, OF GRIESHEIM-ON-THE-MAIN, GERMANY, ASSIGNOR TO CHEMISCHE FABRIK GRIESHEIM-ELEKTRON, OF FRANKFORT-ON-THE-MAIN, GERMANY, A CORPORATION OF GERMANY.

PREPARING CAUSTIC POTASH.

971,145.   Specification of Letters Patent.   Patented Sept. 27, 1910.

No Drawing.   Application filed December 22, 1909.   Serial No. 534,532.

*To all whom it may concern:*

Be it known that I, HEINRICH REITZ, a subject of the German Emperor, and resident at Griesheim-on-the-Main, Germany, have invented certain new and useful Improvements in Preparing Caustic Potash, of which the following is a specification.

The present invention relates to an improved method or process of manufacturing crystallized anhydrous caustic potash.

The German specification No. 189,835 describes a process for the production of anhydrous KOH, which process consists in cooling while stirring, caustic potash melts and separating from the mother lye the caustic potash which has crystallized out of it. If it be desired to obtain a rich yield of anhydrous crystals, the caustic potash melts must be concentrated to more than 90 per cent. of KOH. On cooling while stirring, such highly concentrated melts are (at a little over 200° centigrade) so stiff that separation from the mother lye, of the precipitated crystals is not possible. The precipitation of the crystals is at that temperature already very abundant; the mother lye is absorbed or sucked up by the crystals and the resulting pulp is of a dry granular consistency. At temperatures higher than 200° centigrade the mother lye and crystals could be separated by the process described in the specification of the German Patent 189,835 but, on account of the high temperature, the separation is most difficult and indeed from a practical point of view impracticable, and moreover at these high temperatures the separation of crystals of caustic potash is not very abundant, so that the yield is lower.

The application of the process described in the aforesaid German specification is thus limited only to cases in which but small yields of anhydrous KOH are obtained.

The process in accordance with the present invention is as follows: In order to obtain a high yield of crystals of anhydrous KOH, the lye is evaporated at a temperature of about 350° to 370° centigrade, if the evaporation is effected at ordinary pressure, and at a temperature of 310 to 330° centigrade, if the evaporation takes place in a vacuum, so as to concentrate it to 92 per cent., then the melt is allowed to cool, while being stirred, until the thick pulp is obtained, this occurring at from 220°, to 250°, centigrade, according to the degree of concentration. As it is then no longer possible to readily effect a separation of the precipitated anhydrous crystals from the mother lye, a melt of KOH of less concentration is added to the said thick pulp. The additional melt must be so constituted that, on cooling below 200° centigrade, it does not precipitate any considerable amount of crystals. Then the mixture can be further cooled and the temperature so lowered that separation of the crystals from the lye does not present any difficulties.

By correctly choosing the melt used for dilution, a re-dissolution of the anhydrous KOH crystals takes place, but to a very small extent and the additional melt holds in solution practically all the impurities. In cooling the diluted pulp, the temperature should not decrease to much below 140° centigrade because, below this temperature, the separation of the KOH crystals containing water begins (*Pickering Chem. Soc.* 1893 No. 63 page 890).

The following example will illustrate how this invention may be performed but the invention is not limited to the details of this example: 3 kilograms of 93.7 per cent. potash produced from a 50 per cent. commercial lye are cooled to 220° centigrade while being stirred, and, after further cooling, about 600 grams of a melt of 85.6 per cent. of potash are added little by little until the temperature has lessened to about 140° centigrade, and then, at this temperature, the mass is treated in a hydro-extractor. About 70 per cent. of crystals containing 99.5 per cent. potash are obtained.

If melts containing 90 to 92 per cent. potash be treated, the yield of anhydrous KOH crystals only amounts to from 30 to 45 per cent. of the weight of the concentrated melt.

I claim:—

In the manufacture of anhydrous caustic potash, concentrating caustic potash lye to a degree sufficient that on cooling, while being stirred, a copious formation of anhydrous crystals of caustic potash takes place, then mixing with the thick pulp thus formed, and while stirring, a caustic potash lye of lower percentage, and separating the solid from the liquid at a temperature above that at which the second lye melts and at which temperature no separation of caustic potash containing water takes place.

In testimony whereof I have signed my name to this specification in the presence of two subscribing witnesses.

HEINRICH REITZ.

Witnesses:
FRANZ HASSLACHER,
ERWIN DIPPEL.